2 Sheets—Sheet 1.

D. T. ROBINSON.

Assignor by mesne assignments to H. W. Putnam.

BOTTLE-STOPPER.

No. 7,581. Reissued March 27, 1877.

Witnesses
W. L. Bennett.
Jas. S. Wightman

Inventor
Daniel T. Robinson
by his Atty
C. S. Remington.

N. PETERS, PHOTO-LITHOGRAPHER, WASHINGTON, D. C.

2 Sheets—Sheet 2.

D. T. ROBINSON.

Assignor by mesne assignments to H. W. Putnam.

BOTTLE-STOPPER.

No. 7,581. Reissued March 27, 1877.

Witnesses
W. L. Bennett
Jas. S. Wightman

Inventor
Daniel T. Robinson
by his Atty
C. S. Remrick

N. PETERS, PHOTO-LITHOGRAPHER, WASHINGTON, D. C.

UNITED STATES PATENT OFFICE

DANIEL T. ROBINSON, OF BOSTON, MASSACHUSETTS, ASSIGNOR, BY MESNE ASSIGNMENTS, TO HENRY W. PUTNAM, OF BENNINGTON, VERMONT.

IMPROVEMENT IN BOTTLE-STOPPERS.

Specification forming part of Letters Patent No. 60,424, dated December 11, 1866; reissue No. 7,581, dated March 27, 1877; application filed March 6, 1877.

*To all whom it may concern:*

Be it known that I, DANIEL T. ROBINSON, of Boston, in the county of Suffolk and State of Massachusetts, have made an invention of a new and useful Improvement in Bottle-Stopper Fastenings; and that the following is a full, clear, and exact description thereof, reference being had to the accompanying drawings, making part of this specification.

This invention has reference to the use of perpetual elastic stoppers which are used over and over again, and its object is to enable the bottle-mouth to be rapidly and effectually closed and opened by lever action, and also to secure the rubber portion of the stopper to the hard stopper-body. According to my invention the bottle-mouth is closed by means of a single compound elastic stopper, consisting of a stopper-body of hard material and a circular piece of india-rubber, which intervenes between the stopper-body and the glass of the bottle-mouth, and makes a tight joint between the two. This compound elastic stopper is pressed to the bottle-mouth by means of a cam-lever, which is linked or yoked to a ring made fast to the bottle-mouth; and the fastening is effected by turning the cam-lever on a pivot, so as to force a protuberant portion of the cam-lever down on a seat in the stopper. The various devices and combinations of which the invention is composed are set forth at the close of this specification. In order that they may be fully understood I have represented them in the accompanying drawing, and will proceed to describe a bottle provided with my invention as I applied it previous to filing the application for my original patent.

Figure 1:
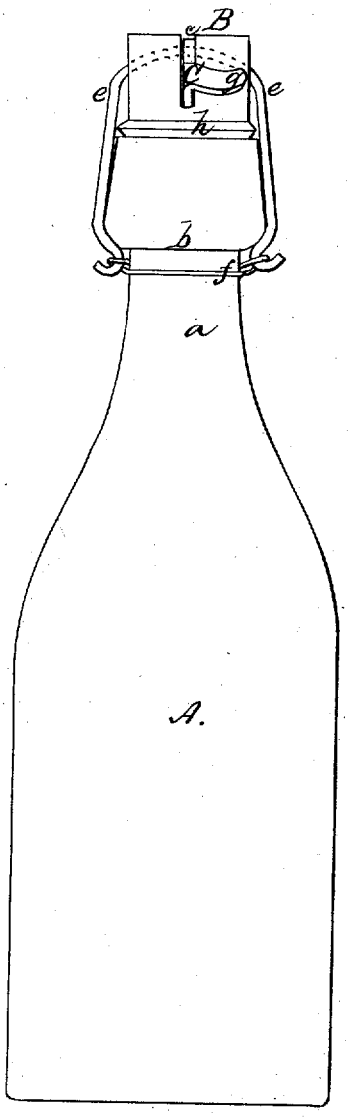
Figure 2:
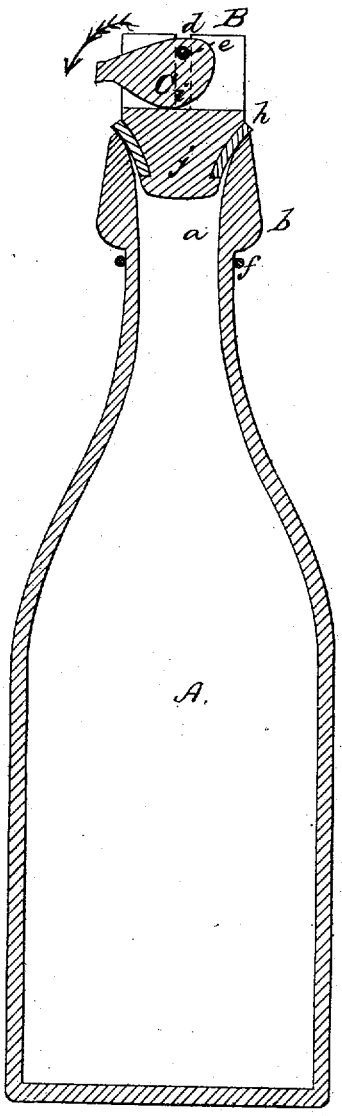
Figure 3:
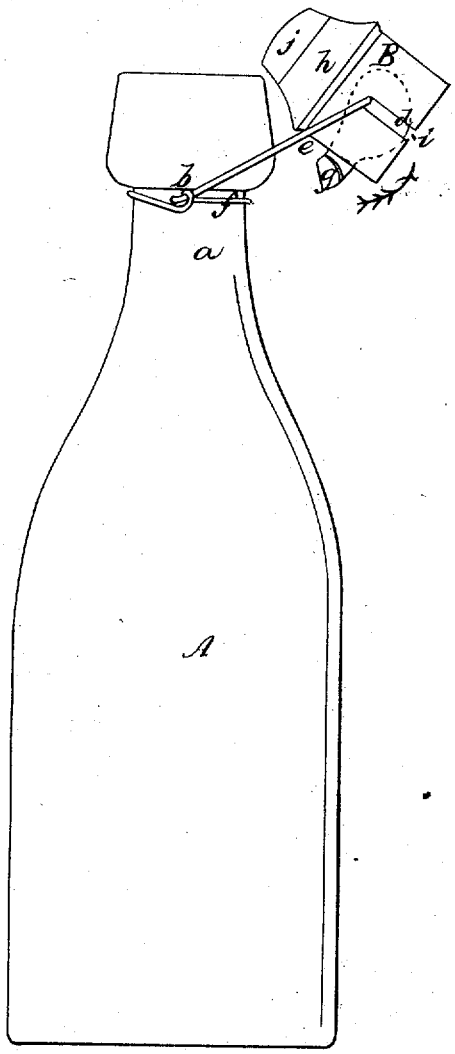
Figure 4:
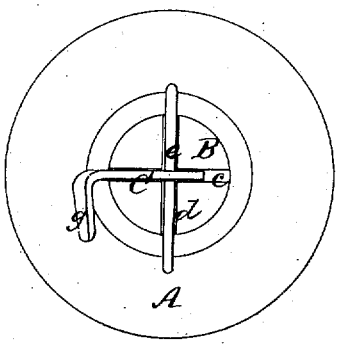
Figure 5:
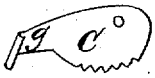
Figure 7:
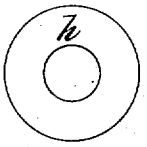
Figure 6:
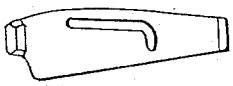

Figure 1 is a side elevation of said bottle and stopper fastening. Fig. 2 is a vertical section of the same. Fig. 3 is a second side elevation of the same, crosswise of the first, and with the stopper disengaged from the bottle-mouth. Fig. 4 is a top view, and Figs. 5, 6, and 7 are views of details of the mechanism.

In the drawings, A represents the body of a bottle, and *a* its neck formed with a shoulder, *b*, in the usual manner. The compound elastic stopper applied to this bottle is composed of a stopper-body, B, of wood or other suitable material, and a piece, *h*, of rubber. It is retained in connections with the bottle-mouth by means of a wire, *e*, to which the cam-lever C is pivoted, and whose ends are connected with the neck of the bottle by means of another wire, *f*, which encircles the bottle-neck so as to be a band therefor. The wire *e* is yoke-formed, its ends passing down at opposite sides of the bottle-neck; and these ends are connected at their extremities with the second or band wire *f* by eyes, so that the cam-lever is linked to the bottle-neck with the capacity of being swung with the stopper over and off from the bottle-mouth. The upper part of the stopper-body is grooved crosswise in two directions, the bottom of one groove, *c*, forming a seat for the reception of the cam-lever C, and the other groove *d* being to receive the yoke-wire *e*, which retains the stopper in connection with the bottle-mouth. The cam-lever is formed with a lateral protuberance, *i*, to act upon the stopper, and with a handle, *g*, by which it may be readily turned on its pivot. The mode in which I have secured the circular piece of rubber successfully to the stopper-body is by constructing the latter with a solid button-headed under projection, *j*, by which I mean one which is formed in one piece with the rest of the stopper-body and projects at its under side, and which also is adapted to enter the mouth of the bottle and to hold the rubber to said body by reason of the engagement of the shoulder of the button-head of the solid projection with the rim of the hole in the rubber.

In order that the operation of the bottle-stopper fastening may be understood, we will suppose the stopper to be in the bottle-mouth, as represented in Fig. 1. By raising the arm or handle *g* of the cam-lever C the protuberance *i* thereof will be turned off its seat, and will allow the stopper to be raised and tipped or turned from the bottle-mouth into the position shown in Fig. 3 of the drawings. When the bottle-mouth is to be closed the stopper is first swung upon the mouth of the bottle, with the rubber *h* downward, and the cam-lever is next turned in the direction of the arrows in Figs. 3 and 2, so as to force its protuberance down on its seat in the stopper-body as far as the form of the cam-lever will permit, whereby the stopper is forced firmly downward and fastened with the rubber portion *h* next the glass, so as to close the bottle-mouth hermetically. The under surface of the protuberance of the cam-lever may be indented or roughened, as shown in Fig. 5 of the drawings, to operate in connection with its seat, the object of the indentation being to prevent any accidental slipping of the lever on its seat. Instead of the cam-lever, I have contemplated the employment of a wedge or tapering piece of metal having a groove formed in it for the reception of the yoke-wire, this wedge being shown in Fig. 6 of the drawings.

The construction of the stopper-body with its button-headed projection solid, or all in one piece, is convenient and economical, as it avoids the necessity of using screws or other removable fastenings to hold the rubber, and the rubber can be readily applied to the stopper-body as its elastic property permits the rim of the hole in the rubber to be stretched so as to pass over the button-head, whereupon the contraction of the said rim causes an engagement with the said head.

I claim as my invention—

1. The combination, substantially as before set forth, of the cam-lever, the yoke-wire, and the stopper-body provided with a transverse groove for the yoke-wire.

2. The combination, substantially as before set forth, of the cam-lever, the yoke-wire, and the stopper-body provided with a transverse groove for the cam-lever.

3. The stopper-body, constructed substantially as before set forth, with a solid button-headed under projection, adapted to enter the mouth of the bottle, and to hold the piece of rubber to the stopper-body.

4. The combination, substantially as before set forth, of the yoke-wire with a stopper-body constructed with a solid button-headed under projection adapted to enter the mouth of the bottle and to hold the piece of rubber to the stopper-body.

5. The combination, substantially as before set forth, of the circular piece of rubber with the stopper-body, having a solid button-headed under projection whose shoulder engages with the rim of the hole in the rubber.

Witness my hand this 19th day of February, A. D. 1877.

DANIEL T. ROBINSON.

Witnesses:

J. H. WOODMAN,

CHAS. ROLLIN BRAINARD.